(12) United States Patent
Tossens et al.

(10) Patent No.: US 12,616,200 B2
(45) Date of Patent: May 5, 2026

(54) HERBICIDAL COMBINATIONS COMPRISING DIFLUFENICAN AND MESOTRIONE

(71) Applicants: BAYER AKTIENGESELLSCHAFT, Leverkusen (DE); MONSANTO TECHNOLOGY LLC, St. Louis, MO (US)

(72) Inventors: Herve Tossens, Leverkusen (DE); John Hemminghaus, St. Louis, MO (US); Alejandro Perez-Jones, St. Louis, MO (US); Dawn Pester, St. Louis, MO (US)

(73) Assignees: BAYER AKTIENGESELLSCHAFT, Leverkusen (DE); MONSANTO TECHNOLOGY LLC, Saint Louis, MO (US)

( * ) Notice: Subject to any disclaimer, the term of this patent is extended or adjusted under 35 U.S.C. 154(b) by 430 days.

(21) Appl. No.: 18/025,444

(22) PCT Filed: Sep. 2, 2021

(86) PCT No.: PCT/US2021/048938
§ 371 (c)(1),
(2) Date: Mar. 9, 2023

(87) PCT Pub. No.: WO2022/055789
PCT Pub. Date: Mar. 17, 2022

(65) Prior Publication Data
US 2024/0023550 A1      Jan. 25, 2024

Related U.S. Application Data

(60) Provisional application No. 63/076,534, filed on Sep. 10, 2020.

(51) Int. Cl.
| | |
|---|---|
| *A01N 43/40* | (2006.01) |
| *A01N 25/02* | (2006.01) |
| *A01N 41/10* | (2006.01) |
| *A01N 43/54* | (2006.01) |
| *A01N 43/707* | (2006.01) |
| *A01P 13/00* | (2006.01) |

(52) U.S. Cl.
CPC ............. *A01N 43/40* (2013.01); *A01N 25/02* (2013.01); *A01N 41/10* (2013.01); *A01N 43/707* (2013.01); *A01P 13/00* (2021.08)

(58) Field of Classification Search
CPC ........ A01N 43/40; A01N 25/02; A01N 41/10; A01N 43/707; A01P 13/00
See application file for complete search history.

(56) References Cited

U.S. PATENT DOCUMENTS

| | | |
|---|---|---|
| 3,905,801 A | 9/1975 | Fawzi |
| 4,618,366 A | 10/1986 | Cramp et al. |
| 5,006,158 A | 4/1991 | Carter et al. |
| 5,506,195 A | 4/1996 | Ensminger et al. |
| 5,912,207 A | 6/1999 | Scher et al. |
| 2005/0026786 A1 | 2/2005 | Deckwer et al. |
| 2005/0143261 A1 | 6/2005 | Feucht et al. |
| 2020/0093136 A1 | 3/2020 | Shinn et al. |

FOREIGN PATENT DOCUMENTS

| | | | |
|---|---|---|---|
| CN | 107751216 A | 3/2018 | |
| CN | 108308184 A | 7/2018 | |
| IL | 181558 A | 9/2011 | |
| WO | WO-9528839 A1 | 11/1995 | |
| WO | WO-0221920 A1 | 3/2002 | |
| WO | WO-02100173 A1 | 12/2002 | |
| WO | WO-03005820 A1 | 1/2003 | |
| WO | WO-03079789 A1 | 10/2003 | |
| WO | WO-2006029736 A1 | 3/2006 | |
| WO | WO-2014001361 A1 | 1/2014 | |
| WO | WO-2014071374 A2 | 5/2014 | |
| WO | WO-2020039366 A1 * | 2/2020 | ............. A01N 33/18 |

\* cited by examiner

*Primary Examiner* — Sahana S Kaup
*Assistant Examiner* — Toriana N. Vigil
(74) *Attorney, Agent, or Firm* — Harness, Dickey & Pierce, P.L.C.

(57) ABSTRACT

The present disclosure primarily relates to certain agro-chemically active herbicidal combinations comprising (A) diflufenican and (B) mesotrione. The disclosure further relates to the use of these combinations for controlling weeds, in particular for controlling resistant weeds, and to corresponding methods.

12 Claims, No Drawings

HERBICIDAL COMBINATIONS COMPRISING DIFLUFENICAN AND MESOTRIONE

CROSS-REFERENCE TO RELATED APPLICATIONS

This application is a U.S. national stage filing under 35 U.S.C. § 371 of International Application No. PCT/US2021/048938, filed on Sep. 2, 2021, which claims the benefit of, and priority to, U.S. Patent Application No. 63/076,534 filed Sep. 10, 2020. The entire disclosures of the above applications are incorporated herein by reference.

FIELD

The present disclosure primarily relates to certain agro-chemically active herbicidal combinations comprising (A) diflufenican and (B) mesotrione. The disclosure further relates to the use of these combinations for controlling weeds, in particular for controlling resistant weeds, and to corresponding methods.

BACKGROUND

This section provides background information related to the present disclosure which is not necessarily prior art.

The protection of crop plants (crops) from weed plants (weeds) and other unwanted vegetation which inhibit crop growth is a constantly recurring problem in agriculture. To help combat this problem, researchers in the field of synthetic chemistry have produced an extensive variety of active herbicidal ingredients (herbicides) and formulations effective in the control of such unwanted growth. Herbicides of many structural types and with different Modes of Action have been disclosed in the literature and a large number are in commercial use.

Active herbicidal ingredients (herbicides) are typically categorized according to their Mode of Action (MoA) (or Site of Action (SoA)). The Mode of Action of herbicides is inter alia relevant concerning the weed spectrum that herbicides are able to control and in particular with respect to the ability to control unwanted plants (weeds) which are resistant (tolerant) or are evolving resistance (tolerance) to one or more Modes of Action.

In normal use, the different classes of herbicides have proved to be very effective across a range of weeds. However, an increasing problem encountered in agriculture is the appearance of weeds that have developed a tolerance to classes of herbicides with certain Modes of Action. By 'tolerance' or "resistance" is meant that these weeds are less easily damaged or killed by the application of these herbicides than the normal phenotype. Typically, these weeds show little or no damage when these herbicides are applied at normal application rates. This tolerance arises naturally and occurs because of the selection pressure exerted on the weed population by repeated application of these herbicides. Some weeds have developed almost complete tolerance to herbicides of a certain Mode of Action, that is, they are virtually undamaged by these herbicides at the normal commercial application rates. Sometimes the word 'resistant' is also used to describe such weeds, in particular where they have the inherited ability to survive treatment by these herbicides.

Herbicide resistance is obviously a problem, because either the weeds thrive to an increasing degree, which drive down crop yields, or alternatively increased quantities of herbicides must be used, which increases cost and risks environmental damage.

The active ingredient diflufenican (IUPAC name: 2',4'-difluoro-2-[3-(trifluoromethyl)phenoxy]pyridine-3-carboxanilide) is an active herbicidal ingredient (herbicide) known from U.S. Pat. No. 4,618,366 and is often abbreviated as DFF. Diflufenican controls unwanted weed plants pre-emergence and early post-emergence in certain crops; see, for example, "The Pesticide Manual", 16th edition, The British Crop Protection Council and the Royal Soc. of Chemistry, 2012, p. 355-357. Diflufenican is an inhibitor of the phytoene desaturase (PDS), blocking carotenoid biosynthesis.

The active ingredient mesotrione (IUPAC name: 2-[4-(methylsulfonyl)-2-nitrobenzoyl]cyclohexane-1,3-dione) is an active herbicidal ingredient (herbicide) known from U.S. Pat. Nos. 5,006,158, 5,506,195 and 5,912,207 and is often abbreviated as MST. Mesotrione controls unwanted weed plants in certain crops; see, for example, "The Pesticide Manual", 16th edition, The British Crop Protection Council and the Royal Soc. of Chemistry, 2012, p. 728-729. Mesotrione is an inhibitor of the 4-hydroxyphenylpyruvate dioxygenase (HPPD).

The active ingredient metribuzin (IUPAC name: 4-amino-6-(1,1-dimethylethyl)-3-(methylthio)-1,2,4-triazin-5(4H)-one) is an active herbicidal ingredient (herbicide) known from U.S. Pat. No. 3,905,801 and is often abbreviated as MRB. Metribuzin controls unwanted weed plants in certain crops; see, for example, "The Pesticide Manual", 16th edition, The British Crop Protection Council and the Royal Soc. of Chemistry, 2012, p. 780-781. Metribuzin is an inhibitor of the Photosystem II (PSII).

A variety of publications disclose herbicidal combinations involving the above-mentioned active herbicidal ingredients. For example, WO95/28839, WO02/21920 and WO02/100173 describe herbicidal combinations comprising mesotrione and herbicidally active triazines.

WO03/005820 teaches a process of controlling triazine-tolerant weeds by the application of a combination of mesotrione and a triazine to the locus of said weeds.

WO03/079789 pertains to combinations of metribuzin and benzoylcyclohexandiones.

IL181558 and WO 2006/029736 disclose certain liquid formulations comprising diflufenican in dissolved form. US 2005/026786 relates to certain oil suspension concentrates containing diflufenican. WO2014/001361 discloses certain combinations of diflufenican and metribuzin.

Herbicidal combinations often extend the weed spectrum for control relative to each of the individual active ingredients, but without producing further possibilities for use, such as deployment in other crops of useful plants, or shifting of the application window. In particular, these herbicidal combinations known from the prior art do not (sufficiently) solve the problem of evolving or increasing resistance developed by weed plants (weeds) to active herbicidal ingredients from certain Modes of Action, for example HPPD inhibitors such as mesotrione.

SUMMARY

This section provides a general summary of the disclosure, and is not a comprehensive disclosure of its full scope or all of its features.

Example embodiments of the present disclosure are generally directed to herbicidal combinations comprising: (A) diflufenican and (B) mesotrione (e.g., as active herbicidal ingredients, etc.); and wherein a ratio by weight of a total amount of component (A) to a total amount of component (B) is in a range of from about 3:1 to about 1:3.

Example embodiments of the present disclosure are also generally directed to herbicidal combinations comprising (A) diflufenican, (B) mesotrione, and (C) metribuzin (e.g., as active herbicidal ingredients, etc.); wherein a ratio by weight of a total amount of component (A) to a total amount of component (B) is in a range of from about 3:1 to about 1:3.

Example embodiments of the present disclosure are also generally directed to methods for controlling weed plants in crops of useful plants, for example, by applying one or more of the herbicidal combinations described above (and/or otherwise described herein) to the weed plants, plants, plant seeds, or to the area on which the weed plants are or will be growing.

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully. The description and specific examples included herein are intended for purposes of illustration only and are not intended to limit the scope of the present disclosure.

It is an object of the present disclosure to provide further herbicidal combinations which permit effective control of unwanted plants (weeds) in various crops of useful plants within user-friendly time windows, and which particular permit effective control of unwanted plants (weeds) which are resistant to at least one Mode of Action.

The above objects have been achieved with herbicidal combinations or compositions, wherein the active herbicidal ingredients comprise or consist of (A) diflufenican, and (B) mesotrione; wherein the ratio by weight of the total amount of component (A) to the total amount of component (B) is in the range of from about 3:1 to about 1:3.

The above objects have also been achieved with herbicidal combinations or compositions, wherein the active herbicidal ingredients comprise or consist of (A) diflufenican, (B) mesotrione, and (C) metribuzin; wherein the ratio by weight of the total amount of component (A) to the total amount of component (B) is in the range of from about 3:1 to about 1:3.

We have now found that certain combinations of diflufenican (component (A)) and mesotrione (component (B)), optionally additionally comprising metribuzin (component (C)) have a synergistic effect in killing weeds and can in particular be used to control weeds which are difficult to control due to their resistance against certain types of herbicides.

Preferred herbicidal combinations or compositions of the present disclosure are those containing (A) diflufenican and (B) mesotrione, and optionally (C) metribuzin as sole active agrochemical ingredients.

Thus, in a preferred embodiment, the herbicidal combination or composition according to the present disclosure contains as sole active herbicidal ingredients (A) diflufenican, and (B) mesotrione; wherein the ratio by weight of the total amount of component (A) to the total amount of component (B) is in the range of from about 3:1 to about 1:3.

Thus, in another preferred embodiment, the herbicidal combination or composition according to the present disclosure contains as sole active herbicidal ingredients (A) diflufenican, (B) mesotrione, and (C) metribuzin; wherein the ratio by weight of the total amount of component (A) to the total amount of component (B) is in the range of from about 3:1 to about 1:3.

The weight ratios of components (A) and (B) and optionally (C) can be varied within these ranges. However, within certain concentration ranges or ratio by weight ranges, the synergistic effect of the herbicidal combinations of the disclosure is particularly pronounced and/or the herbicidal activity and efficacy particularly high.

In a preferred herbicidal combination or composition according to the present disclosure the ratio by weight of the total amount of component (A) diflufenican to the total amount of component (B) mesotrione is in the range of from about 2:1 to about 1:2.

In an also preferred herbicidal combination or composition according to the present disclosure the ratio by weight of the total amount of component (A) diflufenican to the total amount of component (B) mesotrione is in the range of from about 3:2 to about 2:3.

In a further preferred herbicidal combination or composition according to the present disclosure the ratio by weight of the total amount of component (A) diflufenican to the total amount of component (B) mesotrione is in the range of from about 3:2 to about 1:1.

If a herbicidal combination or composition according to the present disclosure comprising as component (C) metribuzin the ratio by weight of the total amount of component (A) diflufenican to the total amount of component (C) preferably is in the range of from about 3:2 to about 1:4.

If a herbicidal combination or composition according to the present disclosure comprising as component (C) metribuzin the ratio by weight of the total amount of component (A) diflufenican to the total amount of component (C) preferably is in the range of from greater than 1:1 to about 1:3.

If a herbicidal combination or composition according to the present disclosure comprising as component (C) metribuzin the ratio by weight of the total amount of component (A) diflufenican to the total amount of component (C) more preferably is about 1:2.

According to a preferred embodiment, in the herbicidal combination or composition according to the present disclosure the ratio by weight of the total amount of component (A) diflufenican to the total amount of component (B) mesotrione is in the range of about 3:2 to 1:1, and the ratio by weight of the total amount of component (A) diflufenican to the total amount of component (C) is about 1:2.

According to another preferred embodiment, in the herbicidal combination or composition according to the present disclosure the ratio by weight of the total amount of component (A) diflufenican to the total amount of component (B) mesotrione is about 1:1, and the ratio by weight of the total amount of component (A) diflufenican to the total amount of component (C) is about 1:2.

The herbicidal combination or composition according to the present disclosure preferably is a composition (i.e. a mixture), preferably in the form of a concentrated formulation or a ready-to-use diluted spray application mixture (tank-mix).

The herbicidal combinations or compositions of the disclosure may comprise or else be used together with additional, further components, examples being active crop protection ingredients of other kinds and/or adjuvants customary in crop protection and/or formulating assistants.

Thus, the herbicidal combinations or compositions according to the present disclosure preferably additionally comprise one or more further constituents selected from the group consisting of water, formulation adjuvants and safeners.

Depending inter alia on the requirements of the crop plants or the weed plants present in the area where the crop plants grow or are intended to grow, it may be desired or necessary to further complement and optimize the weed control spectrum of the combinations or compositions of the present disclosure, the combinations and compositions according to the present disclosure may be combined with one or more further herbicides.

Thus, the herbicidal combinations or compositions according to the present disclosure preferably additionally comprises one or more further herbicides.

Safeners and further herbicides optionally incorporated into the herbicidal combinations and compositions of the present disclosure and the common names used herein are known in the art; see, for example, "The Pesticide Manual" 16$^{th}$ Edition, British Crop Protection Council 2012; these include the known stereoisomers (in particular racemic and enantiomeric pure isomers) and derivatives such as salts or esters, and particularly the commercially customary forms. Where a herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

In these and other embodiments, the one or more further herbicides can be selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, 4-hydroxyphenylpyruvate dioxygenase (HPPD) inhibitors, protoporphyrinogen oxidase (PPO) inhibitors, cellulose inhibitors, mitosis inhibitors, oxidative phosphorylation uncouplers, dihydropteroate synthase inhibitors, fatty acid and lipid biosynthesis inhibitors, auxin transport inhibitors and carotenoid biosynthesis inhibitors, salts and esters thereof, racemic mixtures and resolved isomers thereof, and mixtures thereof.

The Weed Science Society of America (WSSA) publishes the "Herbicide Site of Action (SOA) Classification List" in which the various herbicides are grouped according to their Site of Action. These WSSA Groups are known to those skilled in the art.

In the context of the present disclosure, to further complement and optimize the weed control spectrum of the combinations or compositions of the present disclosure, in a preferred embodiment, the additional herbicides with which the herbicidal combinations or compositions according to the present disclosure may be combined or mixed are preferably selected from the group consisting of herbicides from WSSA Group 4 (auxin herbicides), WSSA Group 14 (protoporphyrinogen oxidase (PPO) inhibitor herbicides) and WSSA Group 15 (VLCFA inhibitor herbicides).

Herbicides from WSSA Group 4 are auxin herbicides which include benzoic acid herbicides, phenoxy herbicides, pyridine carboxylic acid herbicides, pyridineoxy herbicides, pyrimidine carboxy herbicides, quinoline carboxylic acid herbicides, and benzothiazole herbicides. Specific examples of auxin herbicides suitable to be combined with combinations and compositions according to the present disclosure include dicamba (3,6-dichloro-2-methoxy benzoic acid); 2,4-D (2,4-dichlorophenoxyacetic acid); 2,4-DB (4-(2,4-dichlorophenoxy)butanoic acid); dichloroprop (2-(2,4-dichlorophenoxy)propanoic acid); MCPA ((4-chloro-2-methylphenoxy)acetic acid); MCPB (4-(4-chloro-2-methylphenoxy)butanoic acid); aminopyralid (4-amino-3,6-dichloro-2-pyridinecarboxylic acid); fluoroxpyr ([(4-amino-3,5-dichloro-6-fluoro-2-pyridinyl)oxy]acetic acid); triclopyr ([(3,5,6-trichloro-2-pyridinyl)oxy]acetic acid); diclopyr; mecoprop ((2-(4-chloro-2-methylphenoxy)propanoic acid); mecoprop-P; picloram (4-amino-3,5,6-trichloro-2-pyridinecarboxylic acid); quinclorac (3,7-dichloro-8-quinolinecarboxylic acid); quinmerac (7-chloro-3-methyl-8-quinolinecarboxylic acid); aminocyclopyrachlor (6-amino-5-chloro-2-cyclopropyl-4-pyrimidinecarboxylic acid); benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl] pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; and butyl 4-amino-3-chloro-5-fluoro-6-(7-fluoro-1H-indol-6-yl)pyridine-2-carboxylate; including agriculturally acceptable salts and esters thereof, racemic mixtures and resolved isomers thereof; and combinations thereof.

In various embodiments, the auxin herbicide comprises dicamba and/or a salt thereof. Examples of dicamba salts include the monoethanolamine, tetrabutylamine, dimethylamine (e.g., BANVEL, ORACLE, etc.), isopropylamine, diglycolamine (e.g., CLARITY, VANQUISH, etc.), potassium, and sodium salts, and combinations thereof. Commercially available sources of dicamba and its salts includes those products sold under the trade names BANVEL, CLARITY, DIABLO, DISTINCT, ORACLE, VANQUISH, and VISION.

In various embodiments, the auxin herbicide component comprises 2,4-D and/or a salt thereof. Examples of 2,4-D salts include the choline, dimethylamine, and isopropylamine salts, and combinations thereof. Commercially available sources of 2,4-D and its salts include those products sold under trade names BARRAGE, FORMULA 40, OPTAMINE, and WEEDAR 64.

Herbicides from WSSA Group 14 are protoporphyrinogen oxidase (PPO) inhibitor herbicides suitable to be combined with combinations and compositions according to the present disclosure include, for example, acifluorfen, azafenidin, benzfendizone, bifenox, butafenacil, carfentrazone-ethyl, chlomethoxyfen, chlornitrofen, cinidon-ethyl, ethoxyfen-ethyl, epyrifenacil (ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate), fluazolate, flufenpyr-ethyl, flumiclorac, flumiclorac-pentyl, flumioxazin, fluoroglycofen-ethyl, fluthiacet-methyl, fomesafen, halosafen, lactofen, oxadiargyl, oxadiazon, oxyfluorfen, pentoxazone, profluazol, pyraclonil, pyraflufen-ethyl, saflufenacil, sulfentrazone and thidiazimin, trifludimoxazin, agriculturally acceptable salts and (other) esters thereof, and mixtures thereof.

Herbicides from WSSA Group 15 are very long-chain fatty acid (VLCFA) synthesis inhibitor herbicides suitable to be combined with combinations and compositions according to the present disclosure include, for example, acetochlor, alachlor, butachlor, butenachlor, delachlor, diethatyl, dimethachlor, dimethenamid, dimethenamid-P, diphenamid, fentrazamide, flufenacet, mefenacet, metazachlor, metolachlor, S-metolachlor, napropamide, naproanilide, pethoxamid, pretilachlor, pronamide, propachlor, propisochlor, prynachlor, terbuchlor, thenylchlor and xylachlor, agriculturally acceptable salts and esters thereof, and mixtures thereof. In various embodiments, the herbicide from the WSSA Group 15 is acetochlor or flufenacet.

Herbicide off-site movement (migration) is often associated with certain herbicides. Herbicide off-site movement can occur primarily by physical movement or drift of small particles in the spray, contamination of the sprayer, and volatility of the herbicide after application. Volatile herbicides can, under certain application conditions, vaporize into the surrounding atmosphere and migrate from the application site to adjacent crop plants, such as soybeans, corn or cotton, where contact damage to sensitive plants can occur. Spray drift can be attributed to both volatility and the physical movement of small particles from the target site to adjacent crop plants.

Volatility control agents and drift reduction agents are known in the art.

To address drift issues, drift reduction agents (DRAs) (also known as drift retardant agents or drift control agents) can be included in herbicidal compositions. DRAs for herbicidal sprays can work by modifying the size distribution of particles formed by the nozzle. The first type of DRA are polymers, which can increase the extensional viscosity of the spray mixture. These polymers, so far largely limited in commercial practice to polyacrylamides, polyethylene oxide, and guar gum, can shift the spray particle size distribution to larger diameters and be effective in reducing driftable fines for some nozzles. The second type of DRA is known as "oil-type" or "emulsion-type" DRA. As the name suggests, an oil-type DRA, largely immiscible with water, can be included in a tank mix as an emulsion or microemulsion. DRAs of this type are available commercially as additives to a spray tank. These oil-type or emulsion-type DRAs can be effective at the suppression of driftable fines and work well in a wide variety of nozzles.

For example, Monsanto (Bayer) has addressed volatility by adding potassium acetate, with the trade name Vaporgrip™ technology, to auxin herbicide formulations.

Thus, the herbicidal combinations or compositions according to the present disclosure preferably additionally comprise one or more further constituents selected from the group consisting of offsite movement controlling agents, preferably selected from the group consisting of volatility control agents and drift reduction agents (DRAs).

In the context of the herbicidal combinations or compositions according to the present disclosure the volatility control agents preferably comprise or consist of one or more C1-C10 monocarboxylic acids, or a monocarboxylate salt thereof, for example those described in WO 2014/071374. More preferably the volatility control agents used in the context of the herbicidal combinations or compositions according to the present disclosure comprise or consist of formic acid, acetic acid, propionic acid, benzoic acid and alkali metal salts thereof, even more preferably comprise or consist of potassium formate, sodium formate, potassium acetate and/or sodium acetate.

In the context of the herbicidal combinations or compositions according to the present disclosure preferably the polymeric drift reducing agents have a molecular weight of 50,000 Dalton or more, and preferably are selected from the group of polyacrylamides, polyethylene oxides, or guar gums having a molecular weight of 50,000 Dalton or more, and mixtures thereof, and/or the drift reducing agents of the "oil-type" or "emulsion-type" are oily substances selected from the group consisting of fatty triglycerides, fatty hydrocarbons, fatty alcohols, fatty esters, vegetable oils, and mixtures thereof. In context of the oily substances, the term "fatty", refers to a hydrocarbon chain with C8-C30 carbon atoms, preferably to a hydrocarbon chain with C12-C22 carbon atoms.

In some embodiments it may be beneficial that the herbicidal combinations or compositions according to the present disclosure additionally comprise at least one volatility control agent and at least one drift reduction agent.

In the context of the present disclosure, in a preferred embodiment, a or the additional herbicide with which the herbicidal combinations or compositions according to the present disclosure may be combined or mixed is glyphosate and/or salts thereof. Examples of preferred salts of glyphosate are the mono-salts and di-salts of glyphosate and monoethanolamine, diethanolamine, triethanolamine, dimethylamine, n-propylamine, isopropylamine, trimesium, potassium or sodium, and combinations thereof.

The herbicidal combinations or compositions of the disclosure surprisingly show not only a synergistic effect towards unwanted weed plants but also, furthermore, other desired qualities: for instance, they can be applied within a broad time window in crops of useful plants against unwanted weed plants, without significant damage to the useful plants. A further surprising effect is the fact that herbicidal combinations or compositions of the disclosure display a synergistic effect towards weed plants which have developed resistance to one or more Modes of Action, such as HPPD inhibitors.

The herbicidal combinations of the disclosure can be applied in a manner known to the skilled person, as for example together (for example as a co-formulation or as a tank mix) or else a short time after one another (splitting), for example to the plants, plant parts or plant seeds or to the area on which the plants are growing. Possible, for example, is the application of the individual active ingredients or of the herbicidal combinations in two or more portions (sequential application), for example after pre-emergence applications, followed by post-emergence applications, or after early post-emergence applications, followed by applications in the middle or late post-emergence phase. Preference here is given to joint or near-synchronous application of components (A) and (B). Also preferred is application from pre-emergence up to early post-emergence.

In a further aspect, the present disclosure relates to a method for controlling weed plants in crops of useful plants, characterized in that a herbicidal combination or composition according to the present disclosure is applied to the weed plants, plants, plant seeds, or to the area on which weed plants are growing.

In a further aspect, the present disclosure relates the use of a herbicidal combination or composition according to the present disclosure for controlling unwanted plants in crops of useful plants.

When the herbicidal combinations or compositions of the disclosure are used, a very broad spectrum of weed plants are controlled pre-emergence and post-emergence, examples being annual and perennial monocotyledonous or dicotyledonous weeds, and also unwanted crop plants.

The method or use according to the present disclosure can be carried out pre-emergence, early post-emergence or post-emergence.

In view of the level of control of weeds achieved, i.e. the herbicidal activity, in a preferred embodiment, the herbicidal combinations or compositions according to the present disclosure are applied pre-emergence.

The herbicidal combinations or compositions of the disclosure are particularly suitable for use in crops such as cereals, maize (corn), rice, soybean, oilseed rape, sugarbeet, cotton and sugarcane, and for use in long-term crops, in plantations and on non-crop land. Preference is given to their use in crops of corn, cotton and soybean. They are also very suitable for use in transgenic crops of corn, cotton and soybean.

Thus, a preferred method or use according to the present disclosure is characterized in that the crop plants are selected from the group consisting of corn, cotton and soybean.

The method or use according to the present disclosure preferably is characterized in that the crop plants have been genetically modified.

The present disclosure accordingly further provides a method for controlling unwanted plants in plant crops that is characterized in that components (A) and (B) and optionally (C) of the herbicidal combinations or compositions of the disclosure are applied to the plants (e.g. weed plants such as monocotyledonous or dicotyledonous weeds or unwanted crop plants) or to the area on which the plants are growing, such application taking place jointly or separately, for example.

By unwanted plants are meant all plants that are growing at locations where they are unwanted. These may be, for example, weed plants (e.g. monocotyledonous or dicotyledonous weeds or unwanted crop plants).

Monocotyledonous weeds belong, for example, to the genera *Echinochloa, Setaria, Panicum, Digitaria, Phleum, Poa, Festuca, Eleusine, Brachiaria, Lolium, Bromus, Avena, Cyperus, Sorghum, Agropyron, Cynodon, Monochoria, Fimbristylis, Sagittaria, Eleocharis, Scirpus, Paspalum, Ischaemum, Sphenoclea, Dactyloctenium, Agrostis, Alopecurus* and *Apera*.

Dicotyledonous weeds belong, for example, to the genera *Sinapis, Lepidium, Galium, Stellaria, Matricaria, Anthemis, Galinsoga, Chenopodium, Urtica, Senecio, Amaranthus, Portulaca, Xanthium, Convolvulus, Ipomoea, Polygonum, Sesbania, Ambrosia, Kochia, Cirsium, Carduus, Sonchus, Solanum, Rorippa, Rotala, Lindernia, Lamium, Veronica, Abutilon, Emex, Datura, Viola, Galeopsis, Papaver, Centaurea, Trifolium, Ranunculus, Taraxacum* and *Euphorbia*.

The present disclosure also provides for the use of the herbicidal combinations or compositions of the disclosure for controlling unwanted plant growth, preferably in crops of useful plants.

The present disclosure also relates to a method or the use of the herbicidal combinations or compositions of the disclosure, characterized in that it is carried out for difficult to control weeds or plants.

In one aspect, said method or use is carried out for controlling weeds or plants having a resistance to herbicides of one, two, three, four, five or more different Modes of Action, wherein the resistances preferably are selected from the group consisting of auxin herbicide resistance, glyphosate resistance, acetolactate synthase (ALS) inhibitor resistance, 4-hydroxyphenylpyruvate dioxygenase (HPPD) inhibitor resistance, CoA carboxylase (ACCase) inhibitor resistance, photosystem I (PS I) inhibitor resistance, photosystem II (PS II) inhibitor resistance, protoporphyrinogen oxidase (PPO) inhibitor resistance and synthesis of very long-chain fatty acid (VLCFA) inhibitor resistance.

This applies particularly to weeds that are resistant to or are evolving resistance to one or to multiple Modes of Action, in particular resistance to one or more herbicides selected from the group consisting of glyphosate, auxin herbicides (auxins), ALS inhibitor herbicides, PSII inhibitor herbicides, HPPD inhibitor herbicides, PPO inhibitor herbicides and/or VLCFA inhibitor herbicides.

In one aspect, said method or use is carried out for controlling weeds or plants having a resistance to HPPD-inhibitor herbicides.

In another aspect, said method or use is carried out for controlling weeds or plants having a resistance to HPPD-inhibitor herbicides and one, two, three of four further resistances mentioned above, preferably selected from the group consisting of glyphosate resistance, acetolactate synthase (ALS) inhibitor resistance, photosystem II (PS II) inhibitor resistance, protoporphyrinogen oxidase (PPO) inhibitor resistance.

Relevant examples of such resistant weeds in the context of the present disclosure include the following dicotyledonous resistant weeds: *Amaranthus palmeri, Amaranthus tuberculatus, Kochia scoparia, Chenopodium album, Ambrosia trifida*, and *Ambrosia artemisiifolia*. Particularly relevant examples of such resistant weeds are *Amaranthus palmeri* and *Amaranthus tuberculatus*, see the examples of Tables 1 to 15 hereinbelow.

In the context of the present disclosure, the application rate of diflufenican (component (A)) typically is at least about 35 g/ha ((active ingredient in gram per hectare), and/or the application rate of mesotrione (component (B)) typically is at least about 50 g/ha ((active ingredient in gram per hectare).

In the context of the present disclosure, the application rate of diflufenican (component (A)) typically is from about 35 to about 200 g/ha (active ingredient in gram per hectare), preferably from about 75 g/ha to about 175 g/ha. In a preferred embodiment, the application rate of diflufenican (component (A)) is about 150 g/ha.

In the context of the present disclosure, the application rate of mesotrione (component (B)) typically is from about 50 to about 200 g/ha (active ingredient in gram per hectare), preferably from about 90 g/ha to about 160 g/ha. In a preferred embodiment, the application rate of mesotrione (component (B)) is in the range of about 100 g/ha to about 150 g/ha, such as 100 g/ha, 105 g/ha, 125 g/ha, or 147 g/ha.

The present disclosure also relates to a method or the use of the herbicidal combinations or compositions of the disclosure, preferably characterized in that diflufenican (component (A)) is used at an application rate of about 75 g/ha to about 200 g/ha and mesotrione (component (B)) at an application rate of about 50 g/ha to about 200 g/ha.

The present disclosure also relates to a method or the use of the herbicidal combinations of the disclosure, preferably characterized in that diflufenican (component (A)) is used at an application rate of about 100 g/ha to about 175 g/ha and mesotrione (component (B)) at an application rate of about 90 g/ha to about 160 g/ha.

The present disclosure also relates to a method or the use of the herbicidal combinations or compositions of the disclosure, preferably characterized in that diflufenican (component (A)) is used at an application rate of about 130 g/ha to about 160 g/ha and mesotrione (component (B)) at an application rate of about 100 g/ha to about 150 g/ha.

In case a combination or composition according to the present disclosure comprises metribuzin (component (C)) the method or use according to the present disclosure is preferably characterized in that metribuzin is used at an application rate of about 150 g/ha to about 350 g/ha, more preferably at an application rate of about 175 g/ha to about 325 g/ha.

In case a combination or composition according to the present disclosure comprises metribuzin (component (C)) the method or use according to the present disclosure is more preferably characterized in that metribuzin is used at an application rate of about 200 g/ha to about 300 g/ha.

In one of the preferred embodiments, a method or the use of the herbicidal combinations or compositions of the disclosure is characterized in that diflufenican (component (A)) is used at an application rate of about 150 g/ha, mesotrione (component (B)) at an application rate of about 100 g/ha to about 150 g/ha and metribuzin (component (C)) at an application rate of about 300 g/ha.

In another preferred embodiment, a method or the use of the herbicidal combinations or compositions of the disclosure is characterized in that diflufenican (component (A)) is used at an application rate of about 100 g/ha, mesotrione (component (B)) at an application rate of about 100 g/ha to about 125 g/ha and metribuzin (component (C)) at an application rate of about 200 g/ha.

A preferred method or use according to the present disclosure is characterized in that the components (A) and (B), and optionally (C), of the combinations of the present disclosure are applied sequentially.

Another preferred method or use according to the present disclosure is characterized in that the components (A) and (B), and optionally (C), are applied together.

Another preferred method or use according to the present disclosure is characterized in the components (A) and (B), and optionally (C), are applied together as a single composition.

The herbicidal combinations of the disclosure can be produced by known methods, for example as mixed formulations of the individual components, optionally with further active ingredients, adjuvants and/or customary formulation assistants, these combinations being then employed in a customary way as dilutions with water, or may be produced in the form of what are called tank mixes, by joint dilution of the separately formulated or partially separately formulated individual components with water. Likewise possible is the temporally offset application (split application) of the separately formulated or partially separately formulated individual components. Another possibility is the application of the individual components or of the herbicidal combinations in two or more portions (sequential application), as for example after applications pre-emergence, followed by post-emergence applications, or after early post-emergence applications, followed by applications in the middle or late post-emergence phase. Preference here is given to the joint or near-synchronous application of the active ingredients of the respective combination.

The herbicidal combinations or compositions of the disclosure can also be used for controlling weed plants in crops of genetically modified plants that are either already known or are yet to be developed.

In general, transgenic plants are notable for special advantageous properties, for example for resistances to certain pesticides, in particular certain herbicides, resistances to plant diseases or organisms that cause plant diseases, such as certain insects or microorganisms such as fungi, bacteria or viruses. Other special properties relate, for example, to the harvested material with regard to quantity, quality, storability, combination and specific constituents. For instance, there are known transgenic plants with an elevated starch content or altered starch quality, or with a different fatty acid combination in the harvested material. Other special properties may be tolerance or resistance to abiotic stressors, for example heat, low temperatures, drought, salinity and ultraviolet radiation.

Conventional ways of producing new plants which have modified properties in comparison to plants which have existed to date involve, for example, traditional breeding methods and the generation of mutants. Alternatively, new plants with modified properties can be generated with the aid of recombinant methods (see, for example, EP-A-0221044, EP-A-0131624). For example, there have been multiple descriptions of:

genetic modifications of crop plants for the purpose of modifying the starch synthesized in the plants (for example WO 92/11376, WO 92/14827, WO 91/19806);

transgenic crop plants which are resistant to particular herbicides of the glufosinate type (cf., for example, EP-A-0242236, EP-A-242246) or glyphosate type (WO 92/00377) or of the sulphonylurea type (EP-A-0257993, U.S. Pat. No. 5,013,659);

transgenic crop plants, for example cotton, with the ability to produce *Bacillus thuringiensis* toxins (Bt toxins), which make the plants resistant to particular pests (EP-A-0142924, EP-A-0193259);

transgenic crop plants with a modified fatty acid combination (WO 91/13972)

genetically modified crop plants with new plant constituents or secondary metabolites, for example new phytoalexins, which bring about an increased disease resistance (EPA 309862, EPA0464461);

genetically modified plants with reduced photorespiration, which feature higher yields and higher stress tolerance (EPA 0305398);

transgenic crop plants which produce pharmaceutically or diagnostically important proteins ("molecular pharming");

transgenic crop plants which feature higher yields or better quality; and transgenic crop plants which feature a combination, for example, of the abovementioned new properties ("gene stacking").

A large number of molecular-biological techniques by means of which new transgenic plants with modified properties can be produced are known in principle; see, for example, I. Potrykus and G. Spangenberg (eds.), Gene Transfer to Plants, Springer Lab Manual (1995), Springer Verlag Berlin, Heidelberg., or Christou, "Trends in Plant Science" 1 (1996) 423-431).

For such recombinant manipulations, nucleic acid molecules which allow mutagenesis or a sequence change by recombination of DNA sequences can be introduced into plasmids. With the aid of standard methods, it is possible, for example, to undertake base exchanges, remove parts of sequences or add natural or synthetic sequences. For the joining of the DNA fragments to one another, adaptors or linkers can be attached to the fragments; see, for example, Sambrook et al., 1989, Molecular Cloning, A Laboratory Manual, 2nd ed. Cold Spring Harbor Laboratory Press, Cold Spring Harbor, NY; or Winnacker "Gene und Klone" [Genes and Clones], VCH Weinheim 2nd edition 1996.

For example, the production of plant cells with a reduced activity of a gene product can be achieved by expressing at least one corresponding antisense RNA, a sense RNA for achieving a cosuppression effect, or by expressing at least one suitably constructed ribozyme which specifically cleaves transcripts of the abovementioned gene product.

To this end, it is possible firstly to use DNA molecules which encompass the entire coding sequence of a gene product inclusive of any flanking sequences which may be present, and also DNA molecules which only encompass portions of the coding sequence, it being necessary for these portions to be long enough to have an antisense effect in the cells. The use of DNA sequences which have a high degree of homology to the coding sequences of a gene product, but are not completely identical to them, is also possible.

When expressing nucleic acid molecules in plants, the protein synthesized may be localized in any desired compartment of the plant cell. However, in order to achieve localization in a particular compartment, it is possible, for example, to join the coding region to DNA sequences which ensure localization in a particular compartment. Such sequences are known to the skilled person (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106). The nucleic acid molecules can also be expressed in the organelles of the plant cells.

The transgenic plant cells can be regenerated by known techniques to give whole plants. In principle, the transgenic plants may be plants of any desired plant species, i.e. both monocotyledonous and dicotyledonous plants.

For instance, it is possible to obtain transgenic plants whose properties are altered by overexpression, suppression or inhibition of homologous (i.e. natural) genes or gene sequences, or expression of heterologous (i.e. foreign) genes or gene sequences.

Preferably the combinations or compositions according to the disclosure can be used in transgenic crop plants (crops) which are resistant to auxin herbicides such as, for example, dicamba, or to herbicides which inhibit essential plant enzymes, for example acetolactate synthases (ALS), EPSP synthases, glutamine synthases (GS) or 4-hydroxyphenylpyruvate dioxygenases (HPPD).

On employment of the combinations or compositions of the disclosure in transgenic crops, the effects toward weed plants observed in other crops are often also accompanied by effects which are specific to application in the particular transgenic crop, for example an altered or specifically widened spectrum of weeds which can be controlled, altered application rates which can be used for the application, preferably good combinability with the herbicides to which the transgenic crop is resistant, and influencing of growth and yield of the transgenic crop plants.

The disclosure therefore also provides for the use of the combinations or compositions of the disclosure for controlling weed plants in transgenic crop plants.

Preference is given to the use of the combinations or compositions of the disclosure in economically important transgenic crops of useful plants and ornamentals, for example of cereals (e.g. wheat, barley, rye, oats), millet/sorghum, rice, cassava and maize (corn), or else crops of sugarbeet, cotton, soybean, oilseed rape, potato, tomato, peas and other vegetable crops, especially in corn, cotton and soybean.

The disclosure therefore also provides for the use of the combinations or compositions of the disclosure for controlling weed plants in transgenic crop plants or crop plants having tolerance through selective breeding.

The components (A) and (B) and optionally (C) can be converted together or separately into customary formulations, for example for application by spraying, watering and sprinkling, such as solutions, emulsions, suspensions, powders, foams, pastes, granules, aerosols, active ingredient-impregnated natural and synthetic substances, and microencapsulations in polymeric substances. The formulations may comprise the customary auxiliaries and adjuvants.

These formulations are produced in a known manner, for example by mixing the components (A) and (B) and optionally (C) with extenders, i.e. liquid solvents, pressurized liquefied gases and/or solid carriers, optionally with use of surfactants, i.e. emulsifiers and/or dispersants and/or foam formers.

If the extender used is water, it is also possible to use, for example, organic solvents as auxiliary solvents. Useful liquid solvents are essentially: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example petroleum fractions, mineral and vegetable oils, alcohols, such as butanol or glycol and the ethers and esters thereof, ketones, such as acetone, methyl ethyl ketone, methyl isobutyl ketone or cyclohexanone, strongly polar solvents, such as dimethylformamide or dimethyl sulphoxide, and water.

Useful solid carriers include: for example ammonium salts and ground natural minerals, such as kaolins, clays, talc, chalk, quartz, attapulgite, montmorillonite or diatomaceous earth, and ground synthetic minerals, such as finely divided silica, alumina and silicates; useful solid carriers for granules include: for example crushed and fractionated natural rocks, such as calcite, marble, pumice, sepiolite, dolomite and synthetic granules of inorganic and organic flours, and granules of organic material, such as sawdust, coconut shells, maize cobs and tobacco stalks; useful emulsifiers and/or foam formers include: for example nonionic and anionic emulsifiers, such as polyoxyethylene fatty acid esters, polyoxyethylene fatty alcohol ethers, e.g. alkylaryl polyglycol ethers, alkylsulphonates, alkyl sulphates, arylsulphonates and protein hydrolysates; useful dispersants include: for example lignosulphite waste liquors and methylcellulose.

In the formulations, it is possible to use tackifiers such as carboxymethylcellulose, natural and synthetic polymers in the form of powders, granules or latices, such as gum arabic, polyvinyl alcohol and polyvinyl acetate, or else natural phospholipids such as cephalins and lecithins and synthetic phospholipids. Further additives may be mineral and vegetable oils.

It is possible to use colorants such as inorganic pigments, for example iron oxide, titanium oxide and Prussian Blue, and organic dyes, such as alizarin dyes, azo dyes and metal phthalocyanine dyes, and trace nutrients such as salts of iron, manganese, boron, copper, cobalt, molybdenum and zinc.

The products or formulations suitable to be used in the context of the present disclosure contain generally between 1 and 95 percent by weight of components (A) and (B) and component (C), if present, preferably between 5 and 90% by weight.

As such or in their formulations, the components (A) and (B) and optionally (C) can also be used as a mixture with other agrochemically active ingredients for controlling unwanted plant growth, for example for controlling weeds or for controlling unwanted crop plants; finished formulations or tank mixes, for example, are possible.

Also possible are mixtures with other known active ingredients such as fungicides, insecticides, acaricides, nematicides, bird antifeedants, plant nutrients and soil improvers, and likewise with adjuvants and formulation assistants customary in crop protection.

The components (A) and (B) and optionally (C) can be used as such, in the form of their formulations or the use forms prepared therefrom by further dilution, such as ready-to-use solutions, suspensions, emulsions, powders, pastes and granules. Application is typically accomplished, for example, by watering, sprinkling, spraying, broadcasting.

The components (A) and (B) and optionally (C) can be deployed on the plants, plant parts or the area under cultivation (farmland), preferably on the green plants and plant parts, and on the farmland. One means of application is the co-deployment of the active ingredients in the form of tank mixes, by mixing the optimally formulated concentrated formulations of the individual active ingredients together in the tank with water and deploying the spray liquor obtained.

For application, the formulations present in commercial form are optionally diluted in a customary manner, for example using water in the case of wettable powders, emulsifiable concentrates, dispersions and water-dispersible granules. Preparations in the form of dusts, granules for soil application or granules for broadcasting and sprayable solutions are usually not diluted further with other inert substances prior to application.

Biological Examples

Unless indicated otherwise, all amounts and percentages are by weight.

Test conditions in the greenhouse trial, herbicidal activity against weed plants pre-emergence.

Seeds of weed plants and crop plants are sown in 3.5 inches (8.89 cm) pots containing a 50:50 mix of Redi-earth (Sun Gro, Bellevue, Washington) and soil at 0.5 to 0.75 inches (1.27 to 1.905 cm) deep. The compounds of the disclosure, formulated in the form of wettable powders (WP) or emulsifiable concentrates (EC), are then applied to the dry soil surface, in the form of an aqueous suspension or emulsion, using a laboratory track sprayer calibrated to deliver 15 gallons per acre (140.31 L/ha). Following the treatment, the pots are placed in a greenhouse and overhead irrigated with 0.25 inches (0.635 cm) for activation and maintained under good growth conditions for the test plants. Visual scoring of the damage to the trial plants takes place after a trial time of 3 weeks in comparison to untreated controls (herbicidal activity in percent (%): 100% activity=plants have died; 0% activity=as control plants). The results are set out in the tables which follow.

The meanings of the abbreviations are as follows.
DFF=Diflufenican.
MST=Mesotrione.
MRB=Metribuzin.

DFF was used as suspension concentrate (SC formulation) Brodal® (500 g DFF/L), available from Bayer.

MST was used as suspension concentrate (SC formulation) Callisto® (100 g MST/L), available from Syngenta.

MRB was used as TriCor DF® (granules comprising 75 wt. % MRB), available from UPL.

AMAPA (WR-2015-008) *Amaranthus palmeri* (resistant against glyphosate and metribuzin (PSII-inhibitor), PPO-, HPPD- and ALS-inhibitor herbicides).

AMAPA (WR-2013-043) *Amaranthus palmeri* (resistant against HPPD-inhibitor herbicides) (Kansas).

AMAPA (WR-2015-002) *Amaranthus palmeri* (resistant against glyphosate, PPO-, HPPD- and ALS-inhibitor herbicides) (Tennessee).

AMATU (WR-2012-017-08) *Amaranthus tuberculatus* (resistant against HPPD-inhibitor herbicides and atrazine (PSII-inhibitor)) (Illinois).

AMATU (WR-2013-044) *Amaranthus tuberculatus* (resistant against HPPD-inhibitor herbicides and atrazine (PSII-inhibitor)) (Iowa).

Herbicidal activity against different weeds (undesired plants) was calculated as follows:

$$E^C = A + B - A \times B / 100;$$

$$E^C = (A+B+C) - (A \times B + A \times C + B \times C)/100 + (A \times B \times C)/10000;$$

wherein:

A, B, C=respective value in percent of active ingredient A at a dose rate of a g/ha, ingredient B at a dose rate of b g/ha and ingredient C at a dose rate of c g/ha;

$E^C$=Expected value according to Colby (S. R. Colby; Weeds 15 (1967), 20-22) in % at a dose rate of a+b (+c), each in g/ha;

$\Delta$=Difference (%) between measured value E and expected value $E^C$ (%) (measured value minus expected value).

Evaluation:

measured value E is greater than $E^C$: →synergism (+$\Delta$);

measured value E is equal to $E^C$: →additive effect;

measured value E is smaller than $E^C$: →antagonism (−$\Delta$);

All values in Tables 1 to 15 are mean values of 6 repetitions.

TABLE 1

| Active ingredient | Rate [g/ha] | Activity [%] against AMAPA WR-2015-008 |
|---|---|---|
| DFF | 37 | 40.8% |
| MST | 52 | 57.7% |
| MRB | 75 | 39.2% |
| DFF + MRB | 37 + 75 | 50% ($E^C$ = 64%, $\Delta$ = −14%) |
| DFF + MST | 37 + 52 | 87.8% ($E^C$ = 74.8%, $\Delta$ = 13%) |
| DFF + MST + MRB | 37 + 52 + 75 | 85.3% (EC = 84.7%, $\Delta$ = 0.6%) |

TABLE 2

| Active ingredient | Rate [g/ha] | Activity [%] against AMAPA WR-2015-008 |
|---|---|---|
| DFF | 75 | 51.7% |
| MST | 105 | 85% |
| MRB | 150 | 45% |
| DFF + MRB | 75 + 150 | 65.8% ($E^C$ = 73.3%, $\Delta$ = −7.5%) |
| DFF + MST | 75 + 105 | 97% ($E^C$ = 92.8%, $\Delta$ = 4.2%) |
| DFF + MST + MRB | 75 + 105 + 150 | 99.7% (EC = 96%, $\Delta$ = 3.7%) |

TABLE 3

| Active ingredient | Rate [g/ha] | Activity [%] against AMAPA WR-2013-043 |
|---|---|---|
| DFF | 75 | 47.5% |
| MST | 52 | 55.0% |
| DFF + MST | 75 + 52 | 81.7% ($E^C$ = 76.4%, $\Delta$ = 5.3%) |

TABLE 4

| Active ingredient | Rate [g/ha] | Activity [%] against AMAPA WR-2013-043 |
|---|---|---|
| DFF | 150 | 63.3% |
| MST | 52 | 55.0% |
| DFF + MST | 150 + 52 | 95.2% ($E^C$ = 83.5%, Δ = 11.7%) |

TABLE 5

| Active ingredient | Rate [g/ha] | Activity [%] against AMAPA WR-2013-043 |
|---|---|---|
| DFF | 75 | 47.5% |
| MST | 105 | 70.5% |
| DFF + MST | 75 + 105 | 88.8% ($E^C$ = 84.5%, Δ = 4.3%) |

TABLE 6

| Active ingredient | Rate [g/ha] | Activity [%] against AMAPA WR-2013-043 |
|---|---|---|
| DFF | 150 | 63.3% |
| MST | 105 | 70.5% |
| DFF + MST | 150 + 105 | 95.2% ($E^C$ = 89.2%, Δ = 6.0%) |

TABLE 7

| Active ingredient | Rate [g/ha] | Activity [%] against AMAPA WR-2015-002 |
|---|---|---|
| DFF | 75 | 45.8% |
| MST | 105 | 82.5% |
| DFF + MST | 75 + 105 | 96.0% ($E^C$ = 90.5%, Δ = 5.5%) |

TABLE 8

| Active ingredient | Rate [g/ha] | Activity [%] against AMAPA WR-2015-002 |
|---|---|---|
| DFF | 150 | 71.7% |
| MST | 105 | 82.5% |
| DFF + MST | 150 + 105 | 98.0% ($E^C$ = 95.0%, Δ = 3.0%) |

TABLE 9

| Active ingredient | Rate [g/ha] | Activity [%] against AMATU WR-2012-017-08 |
|---|---|---|
| DFF | 75 | 66.7% |
| MST | 52 | 59.2% |
| DFF + MST | 75 + 52 | 91.0% ($E^C$ = 86.4%, Δ = 4.6%) |

TABLE 10

| Active ingredient | Rate [g/ha] | Activity [%] against AMATU WR-2012-017-08 |
|---|---|---|
| DFF | 150 | 86.3% |
| MST | 52 | 59.2% |
| DFF + MST | 150 + 52 | 97.2% ($E^C$ = 94.4%, Δ = 2.8%) |

TABLE 11

| Active ingredient | Rate [g/ha] | Activity [%] against AMATU WR-2012-017-08 |
|---|---|---|
| DFF | 75 | 66.7% |
| MST | 105 | 84.2% |
| DFF + MST | 75 + 105 | 97.7% ($E^C$ = 94.7%, Δ = 3.0%) |

TABLE 12

| Active ingredient | Rate [g/ha] | Activity [%] against AMATU WR-2012-017-08 |
|---|---|---|
| DFF | 150 | 86.3% |
| MST | 105 | 84.2% |
| DFF + MST | 150 + 105 | 98.3% ($E^C$ = 97.8%, Δ = 0.5%) |

TABLE 13

| Active ingredient | Rate [g/ha] | Activity [%] against AMATU WR-2013-044 |
|---|---|---|
| DFF | 150 | 80.8% |
| MST | 52 | 70.0% |
| DFF + MST | 150 + 52 | 98.3% ($E^C$ = 94.2%, Δ = 4.1%) |

TABLE 14

| Active ingredient | Rate [g/ha] | Activity [%] against AMATU WR-2013-044 |
|---|---|---|
| DFF | 75 | 69.2% |
| MST | 105 | 76.7% |
| DFF + MST | 75 + 105 | 96.7% ($E^C$ = 92.8%, Δ = 3.9%) |

TABLE 15

| Active ingredient | Rate [g/ha] | Activity [%] against AMATU WR-2013-044 |
|---|---|---|
| DFF | 150 | 80.8% |
| MST | 105 | 76.7% |
| DFF + MST | 150 + 105 | 99.2% ($E^C$ = 95.5%, Δ = 3.7%) |

EMBODIMENTS

For further illustration, embodiments of the present disclosure are set forth below.

Embodiment 1 is a herbicidal combination, wherein the active herbicidal ingredients comprise or consist of (A) diflufenican, and (B) mesotrione; wherein the ratio by weight of the total amount of component (A) to the total amount of component (B) is in the range of from about 3:1 to about 1:3.

Embodiment 2 is a herbicidal combination, wherein the active herbicidal ingredients comprise or consist of (A) diflufenican, (B) mesotrione, and (C) metribuzin; wherein the ratio by weight of the total amount of component (A) to the total amount of component (B) is in the range of from about 3:1 to about 1:3.

Embodiment 3 is the herbicidal combination according to Embodiment 1 or 2, wherein the ratio by weight of the total amount of component (A) to the total amount of component (B) is in the range of from about 2:1 to about 1:2.

Embodiment 3 is the herbicidal combination according to any one of Embodiments 1 to 3, wherein the ratio by weight of the total amount of component (A) to the total amount of component (B) is in the range of from about 3:2 to about 2:3.

Embodiment 4 is the herbicidal combination according to any one of Embodiments 1 to 4, wherein the ratio by weight of the total amount of component (A) to the total amount of component (B) is in the range of from about 3:2 to about 1:1.

Embodiment 6 is the herbicidal combination according to any one of Embodiments 2 to 5, wherein the ratio by weight of the total amount of component (A) to the total amount of component (C) is in the range of from about 3:2 to about 1:4.

Embodiment 7 is the herbicidal combination according to any one of Embodiments 2 or 6, wherein the ratio by weight of the total amount of component (A) to the total amount of component (C) is in the range of from greater than 1:1 to about 1:3.

Embodiment 8 is the herbicidal combination according to any one of Embodiments 2 or 7, wherein the ratio by weight of the total amount of component (A) to the total amount of component (C) is about 1:2.

Embodiment 9 is the herbicidal combination according to any one of Embodiments 1 to 8, wherein the herbicidal combination additionally comprises one or more further constituents selected from the group consisting of water, formulation adjuvants and safeners.

Embodiment 10 is the herbicidal combination according to any one of Embodiments 1 to 9, wherein the herbicidal combination additionally comprises one or more further herbicides, preferably selected from the group consisting of herbicides from WSSA Group 4, WSSA Group 14 and WSSA Group 15.

Embodiment 11 is the herbicidal combination according to any one of Embodiments 1 to 10, wherein the herbicidal combination is a composition in the form of a concentrated formulation or a ready-to-use diluted spray application mixture (tank-mix).

Embodiment 12 is a method for controlling weed plants in crops of useful plants, characterized in that a herbicidal combination according to any one of Embodiments 1 to 11 is applied to the weed plants, plants, plant seeds, or to the area on which the weed plants are or will be growing.

Embodiment 13 is the use of a herbicidal combination according to any one of Embodiments 1 to 11 for controlling unwanted plants in crops of useful plants.

Embodiment 14 is the method or use according to Embodiment 12 or 13, characterized in that the crop plants are selected from the group consisting of corn, cotton and soybean.

Embodiment 15 is the method or use according to any one of Embodiments 12 to 14, characterized in that the crop plants have been genetically modified.

Embodiment 16 is the method or use according to any one of Embodiments 12 to 15, characterized in that it is carried out pre-emergence, early post-emergence or post-emergence.

Embodiment 17 is the method or use according to any one of Embodiments 12 to 16, characterized in that it is carried out for difficult to control weeds or plants.

Embodiment 18 is the method or use according to any one of Embodiments 12 to 17, characterized in that it is carried out for controlling weeds or plants having a resistance to herbicides of one, two, three, four, five or more different Modes of Action, wherein resistances preferably are selected from the group consisting of auxin resistance, glyphosate resistance, acetolactate synthase (ALS) inhibitor resistance, 4-hydroxyphenylpyruvate dioxygenase (HPPD) inhibitor resistance, CoA carboxylase (ACCase) inhibitor resistance, photosystem I (PS I) inhibitor resistance, photosystem II (PS II) inhibitor resistance, protoporphyrinogen oxidase (PPO) inhibitor resistance and synthesis of very long-chain fatty acid (VLCFA) inhibitor resistance.

Embodiment 19 is the method or use according to any one of Embodiments 12 to 18, characterized in that (i) diflufenican is used at an application rate of at least about 35 g/ha, and/or (ii) mesotrione at an application rate of at least about 50 g/ha.

Embodiment 20 is the method or use according to any one of Embodiments 12 to 19, characterized in that (i) diflufenican is used at an application rate of about 75 g/ha to about 200 g/ha, and/or (ii) mesotrione at an application rate of about 50 g/ha to about 200 g/ha.

Embodiment 21 is the method or use according to any one of Embodiments 12 to 20, characterized in that metribuzin is used at an application rate of about 150 g/ha to about 350 g/ha.

Embodiment 22 is the method or use according to any one of Embodiments 12 to 21, characterized in that metribuzin is used at an application rate of about 175 g/ha to about 325 g/ha.

Embodiment 23 is the method or use according to any one of Embodiments 12 to 22, characterized in that metribuzin is used at an application rate of about 200 g/ha to about 300 g/ha.

Embodiment 24 is the method or use according to any one of Embodiments 12 to 23, wherein the active herbicidal ingredients (A) and (B), and optionally (C), are applied sequentially.

Embodiment 25 is the method or use according to any one of Embodiments 12 to 23, wherein the active herbicidal ingredients (A) and (B), and optionally (C), are applied together.

Embodiment 26 is the method or use according to Embodiment 25, wherein the active herbicidal ingredients (A) and (B), and optionally (C), are applied together as a single composition.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9".

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A herbicidal combination, the combination comprising active herbicidal ingredients consisting of:
   (A) diflufenican; and
   (B) mesotrione;
   wherein a ratio by weight of a total amount of component (A) to a total amount of component (B) is in a range of from about 3:1 to about 1:3.

2. The herbicidal combination according to claim 1, wherein the ratio by weight of the total amount of component (A) to the total amount of component (B) is in a range of from about 2:1 to about 1:2.

3. The herbicidal combination according to claim 1, wherein the ratio by weight of the total amount of component (A) to the total amount of component (B) is in a range of from about 3:2 to about 2:3.

4. The herbicidal combination according to claim 1, wherein the ratio by weight of the total amount of component (A) to the total amount of component (B) is in a range of from about 3:2 to about 1:1.

5. The herbicidal combination according to claim 1, further comprising one or more further constituents selected from the group consisting of water, formulation adjuvants and safeners.

6. The herbicidal combination according to claim 1, wherein the herbicidal combination is a composition in a form of a concentrated formulation or a ready-to-use diluted spray application mixture.

7. A method for controlling weed plants in crops of useful plants, characterized in that the herbicidal combination according to claim 1 is applied to the weed plants, crop plants, plant seeds, or to the area on which the weed plants are or will be growing.

8. The method of claim 7, further comprising applying the herbicidal combination to the weed plants, crop plants, plant seeds, or to the area on which the weed plants are or will be growing.

9. The method according to claim 7, characterized in that the crop plants are selected from the group consisting of corn, cotton and soybean, and wherein the crop plants preferably have been genetically modified.

10. The method according to claim 7, characterized in that the method or the use is carried out pre-emergence, early post-emergence or post-emergence.

11. The method according to claim 7, characterized in that the method or use is carried out for difficult to control weeds or plants, preferably for controlling weeds or plants having a resistance to herbicides of one, two, three, four, five or more different Modes of Action, wherein the resistances preferably are selected from the group consisting of auxin resistance, glyphosate resistance, acetolactate synthase (ALS) inhibitor resistance, 4-hydroxyphenylpyruvate dioxygenase (HPPD) inhibitor resistance, CoA carboxylase (ACCase) inhibitor resistance, photosystem I (PS I) inhibitor resistance, photosystem II (PS II) inhibitor resistance, protoporphyrinogen oxidase (PPO) inhibitor resistance and synthesis of very long-chain fatty acid (VLCFA) inhibitor resistance.

12. The method according to claim 7, characterized in that:
   the diflufenican is used at an application rate of at least about 35 g/ha, preferably at an application rate of about 75 g/ha to about 200 g/ha; and/or
   the mesotrione is used at an application rate of at least about 50 g/ha, preferably at an application rate of about 50 g/ha to about 200 g/ha.

* * * * *